US007493005B2

(12) United States Patent
Beck

(10) Patent No.: US 7,493,005 B2
(45) Date of Patent: Feb. 17, 2009

(54) COUPLER FOR CABLE TROUGH

(75) Inventor: Ronald A. Beck, St. Paul, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/677,184

(22) Filed: Feb. 21, 2007

(65) Prior Publication Data
US 2008/0199142 A1 Aug. 21, 2008

(51) Int. Cl.
G02B 6/00 (2006.01)
(52) U.S. Cl. ........................ 385/137; 385/134
(58) Field of Classification Search ......... 385/134–136, 385/137; 248/68.1; 52/220.5
See application file for complete search history.

(56) References Cited
U.S. PATENT DOCUMENTS

| 2,316,166 A | | 4/1943 | Huguelet |
| 2,360,159 A | | 10/1944 | Peck |
| 2,569,532 A | * | 10/1951 | Marshall et al. ............. 411/446 |
| 2,741,499 A | | 4/1956 | Kussmaul |
| 2,821,154 A | | 1/1958 | Tennison, Jr. |
| 2,823,056 A | | 2/1958 | DiMeo et al. |
| 2,834,622 A | | 5/1958 | Reeves |
| 2,880,887 A | | 4/1959 | McClurg |
| 2,891,750 A | | 6/1959 | Bergquist |
| 3,022,972 A | | 2/1962 | Bunston |
| 3,042,351 A | | 7/1962 | Du Bois |
| 3,188,030 A | | 6/1965 | Fischer |
| 3,351,699 A | | 11/1967 | Merckle |
| 3,370,121 A | | 2/1968 | Merckle |
| 3,457,598 A | | 7/1969 | Mariani |
| 3,471,629 A | | 10/1969 | O'Leary |
| 3,493,917 A | | 2/1970 | Glowacz |
| 3,603,625 A | | 9/1971 | Cottrell et al. |
| 3,782,420 A | | 1/1974 | Kolb et al. |
| 3,875,618 A | | 4/1975 | Schuplin |

(Continued)

FOREIGN PATENT DOCUMENTS

DE 3636412 A1 4/1988

(Continued)

OTHER PUBLICATIONS

Exhibit A, Ditel, Inc.; Ditel UPL-1000/UPT-1000/Corner Cable Guides; product information, 2 pages, © 1986.

(Continued)

Primary Examiner—Sarah Song
(74) Attorney, Agent, or Firm—Merchant & Gould P.C.

(57) ABSTRACT

Clips, couplers, systems, and methods for joining two or more trough members. A cable trough system includes a first trough member including an exterior surface with a slot, and a clip including first and second ends positioned in the slot. The system includes a coupler including a body, and a locking element including a main body, a clip member configured to couple the main body to the coupler, a first arm extending from the main body, the first arm being configured to flex relative to the main body, and a first barb coupled to the first arm. When the first trough member is fully inserted into the coupler, the first barb engages the first end of the clip in the slot to couple the first trough member to the coupler.

15 Claims, 12 Drawing Sheets

U.S. PATENT DOCUMENTS

| | | | |
|---|---|---|---|
| 3,915,420 A | 10/1975 | Norris |
| 4,099,749 A | 7/1978 | van Vliet |
| 4,305,236 A | 12/1981 | Williams |
| 4,854,665 A | 8/1989 | Gagnon |
| 4,954,015 A | 9/1990 | McGowan |
| 5,035,092 A | 7/1991 | Brant |
| 5,038,528 A | 8/1991 | Brant |
| 5,067,678 A | 11/1991 | Henneberger et al. |
| 5,078,530 A | 1/1992 | Kim |
| 5,100,221 A | 3/1992 | Carney et al. |
| 5,134,250 A | 7/1992 | Caveney et al. |
| 5,142,606 A | 8/1992 | Carney et al. |
| 5,161,580 A | 11/1992 | Klug |
| 5,316,243 A | 5/1994 | Henneberger |
| D348,651 S | 7/1994 | Henneberger |
| 5,469,893 A | 11/1995 | Caveney et al. |
| 5,547,307 A | 8/1996 | Decore et al. |
| 5,617,678 A | 4/1997 | Morandin et al. |
| 5,720,567 A | 2/1998 | Rinderer |
| 5,752,781 A | 5/1998 | Haataja et al. |
| 5,753,855 A | 5/1998 | Nicoli et al. |
| 5,792,993 A | 8/1998 | Rinderer |
| D402,262 S | 12/1998 | Scherer et al. |
| D402,263 S | 12/1998 | Scherer et al. |
| D413,306 S | 8/1999 | Scherer et al. |
| 5,995,699 A | 11/1999 | Vargas et al. |
| 5,998,732 A | 12/1999 | Caveney et al. |
| D419,962 S | 2/2000 | Caveney |
| 6,037,543 A | 3/2000 | Nicoli et al. |
| D430,543 S | 9/2000 | Rohder |
| 6,126,122 A | 10/2000 | Ismert |
| 6,143,984 A | 11/2000 | Auteri |
| 6,188,024 B1 | 2/2001 | Benito-Navazo |
| 6,193,434 B1 | 2/2001 | Durin et al. |
| D447,737 S | 9/2001 | Scherer et al. |
| 6,402,418 B1 | 6/2002 | Durin et al. |
| 6,424,779 B1 | 7/2002 | Ellison et al. |
| 6,450,458 B1 | 9/2002 | Bernard |
| 6,454,485 B2 | 9/2002 | Holcomb et al. |
| 6,463,631 B2 | 10/2002 | Noda |
| 6,476,327 B1 | 11/2002 | Bernard et al. |
| 6,512,875 B1 | 1/2003 | Johnson et al. |
| 6,520,192 B1 | 2/2003 | Lo |
| 6,523,791 B2 | 2/2003 | Bernard et al. |
| 6,603,073 B2 | 8/2003 | Ferris |
| 6,634,605 B2 | 10/2003 | Bernard et al. |
| 6,634,825 B2 | 10/2003 | Tolkoff et al. |
| 6,709,186 B2 | 3/2004 | Ferris et al. |
| 6,715,719 B2 | 4/2004 | Nault et al. |
| 6,810,191 B2 | 10/2004 | Ferris et al. |
| 7,029,195 B2 | 4/2006 | Nault et al. |
| 7,093,997 B2 | 8/2006 | Ferris et al. |
| 7,175,137 B2 | 2/2007 | Ferris et al. |
| 7,246,778 B2 | 7/2007 | Caveney et al. |
| 2002/0006312 A1 | 1/2002 | Buard |
| 2002/0096606 A1 | 7/2002 | Bernard et al. |
| 2003/0147690 A1 | 8/2003 | Ronnquist |
| 2003/0177628 A1 | 9/2003 | Viklund |
| 2003/0183731 A1 | 10/2003 | Ferris et al. |
| 2003/0183732 A1 | 10/2003 | Nault et al. |
| 2004/0159750 A1 | 8/2004 | Ferris et al. |
| 2006/0210356 A1 | 9/2006 | Ferris et al. |
| 2006/0261240 A1 | 11/2006 | Ferriis et al. |

FOREIGN PATENT DOCUMENTS

| | | |
|---|---|---|
| DE | 102 12 285 A1 | 11/2002 |
| EP | 0 315 023 A2 | 5/1989 |
| EP | 0 571 307 A1 | 11/1993 |
| EP | 0 486 442 B1 | 10/1995 |
| EP | 0 874 260 A1 | 10/1998 |
| EP | 1 033 800 A1 | 9/2000 |
| EP | 1 160 949 A2 | 12/2001 |
| EP | 1 160 950 A2 | 12/2001 |
| EP | 1 249 912 A1 | 10/2002 |
| FR | 1479341 | 5/1967 |
| GB | 549840 | 12/1942 |
| GB | 1 342 085 | 12/1973 |
| WO | 99/06746 | 2/1999 |
| WO | 00/75550 | 12/2000 |
| WO | 02/18991 | 3/2002 |
| WO | 02/31939 | 4/2002 |
| WO | 02/33445 | 4/2002 |
| WO | 02/086576 A1 | 10/2002 |
| WO | 2004/006400 A1 | 1/2004 |

OTHER PUBLICATIONS

Exhibit B, ADC Telecommunications, Inc.; FiberGuide™, Fiber Management System, 6 pages front and back printed, 16/1989.

Exhibit C, Warren & Brown Technologies Pty. Ltd., Fibre Optic Management Systems, Component Selection Guide, 19 pages of product information. Source: www.warrenandbrown.com.au (admitted prior art as of the filing date).

Exhibit D, Panduit Network Connectivity Group, FiberRunner™ 6×4 Routing System Product Brochure, 2 pages, © Panduit Corp. 2000.

Exhibit E, Panduit Corp. FiberRunner™ 4×4 Quiklock™ Coupler (FRBC4×4) Customer Drawing, 1 page, Jul. 13, 2001.

Exhibit F, Panduit Corp. FiberRunner™ 6×4 Quiklock™ Coupler (FRBC6×4) Customer Drawing, 1 page, May 10, 2000.

Exhibit G, Panduit Corp. FiberRunner™ 12×4 Quiklock™ Coupler (FRBC12×4) Customer Drawing, 1 page, Jan. 3, 2001.

Exhibits H-Y, Photographs of various Panduit products (admitted prior art as of the filing date).

U.S. Appl. No. 11/425,625, filed on Jun. 21, 2006.
U.S. Appl. No. 11/677,174, filed on Feb. 21, 2007.
U.S. Appl. No. 11/677,181, filed on Feb. 21, 2007.
U.S. Appl. No. 11/677,188, filed on Feb. 21, 2007.
U.S. Appl. No. 11/677,193, filed on Feb. 21, 2007.
U.S. Appl. No. 11/677,200, filed on Feb. 21, 2007.
U.S. Appl. No. 11/677,203, filed on Feb. 21, 2007.

\* cited by examiner

FIG. 6
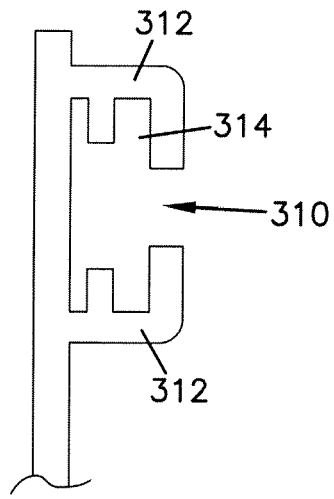
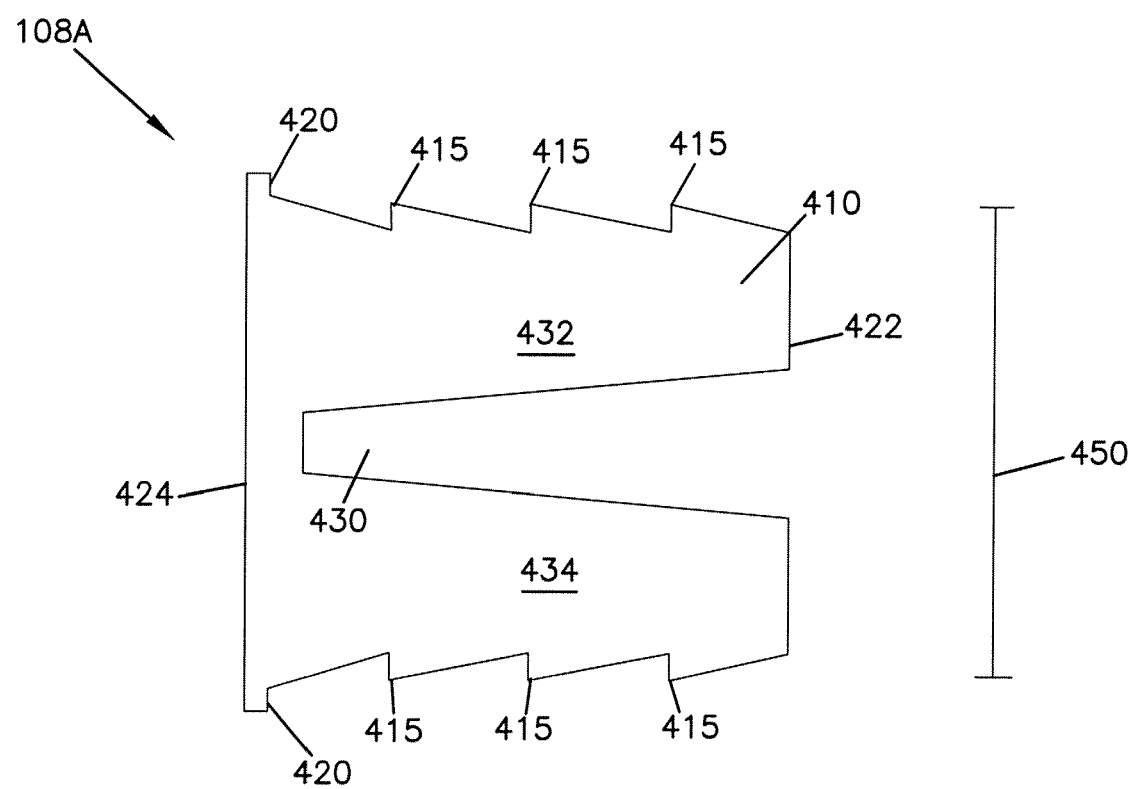
FIG. 7

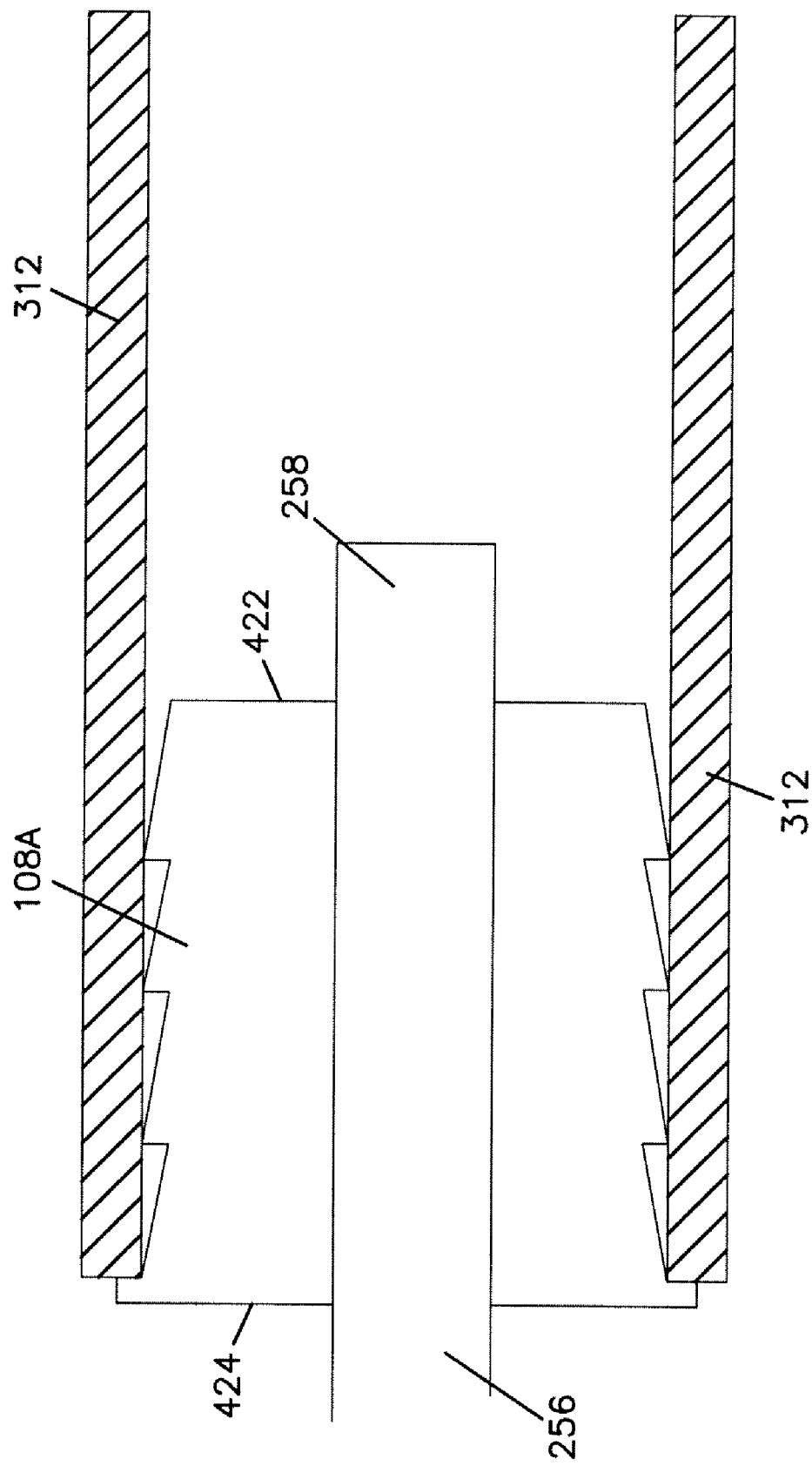

COUPLER FOR CABLE TROUGH

RELATED APPLICATIONS

This application is related to the following applications: U.S. patent application Ser. No. 11/677,181; U.S. patent application Ser. No. 11/677,188; U.S. patent application Ser. No. 11/677,193; U.S. patent application Ser. No. 11/677,200; U.S. patent application Ser. No. 11/677,203; and U.S. patent application Ser. No. 11/677,174; all of which were filed on even date herewith and are incorporated by reference herein.

TECHNICAL FIELD

Embodiments disclosed herein relate to systems for the management and routing of telecommunication cables, and, more particularly, to couplers for joining trough members.

BACKGROUND

In the telecommunications industry, optical fiber systems are increasingly used for high-speed signal transmission. With the increased utilization of optical fiber systems, optical fiber cable management requires industry attention.

One area of optical fiber management is the routing of optical fibers from one piece of equipment to another. For example, in a telecommunications facility, optical fiber cables are routed between fiber distribution equipment and optical line terminating equipment. In buildings and other structures that carry such equipment, the cable routing typically takes place in concealed ceiling areas or in other manners to route cables from one location to another.

When routing optical fibers and other cables such as copper wires, it is desirable that a routing system is readily modifiable and adaptable to changes in equipment needs. Accordingly, such routing systems include a plurality of components, such as trough members and couplers, for defining the cable routing paths. The trough members are joined together by couplings. U.S. Pat. Nos. 5,067,678; 5,316,243; 5,752,781; 6,709,186; and 6,715,719 teach cable routing systems that include a plurality of trough members and couplers.

Various concerns arise with the use of couplers for coupling trough members. One concern is that a plurality of hardware is used for joining the trough members. This hardware can be cumbersome. Further, there is sometimes a need to rearrange or change the trough members and couplers. It is desirable to provide couplers that can be disconnected and reconnected.

SUMMARY

Embodiments disclosed herein relate to a system for the management and routing of telecommunication cables, and, more particularly, to clips, couplers, systems, and methods for joining two or more trough members.

One aspect relates to a cable trough system including a first trough member including an exterior surface defining a slot extending in a longitudinal direction along the exterior surface, and a clip including first and second ends positioned in the slot adjacent a terminal end of the first trough member. The system includes a coupler including a body including a bottom wall and two side walls defining a trough, the body having a body terminal end defining an overlap region, the overlap region being sized to slideably receive a terminal end of a first trough member along a longitudinal direction of the body, and the coupler including a locking element including a main body, a clip member configured to couple the main body to the coupler, a first arm extending from the main body, the first arm being configured to flex relative to the main body, and a first barb coupled to the first arm. As the first trough member is inserted into the coupler, the first barb of the locking element contacts and rides along a surface of the clip, and wherein, when the first trough member is fully inserted into the coupler, the first barb engages the first end of the clip in the slot to couple the first trough member to the coupler.

DESCRIPTION OF THE DRAWINGS

FIG. 6 is a side view of a portion of the trough member of FIG. 5 including a slot.

FIG. 7 is a side view of an embodiment of a clip of the trough system of FIG. 1.

FIG. 13 is another cross-sectional view of the portion of the trough member fully coupled to the coupler of FIG. 10.

DETAILED DESCRIPTION

As used herein, the terms "couple" and "coupled" mean to join or attach a first element in relation to a second element, whether the attachment is made directly with the second element or indirectly through one or more intermediate components. As used herein, the term "slot" means a space defined by one or more surfaces and can include, without limitation, T-slots, closed slots, flanges, and projections.

Figure 1:
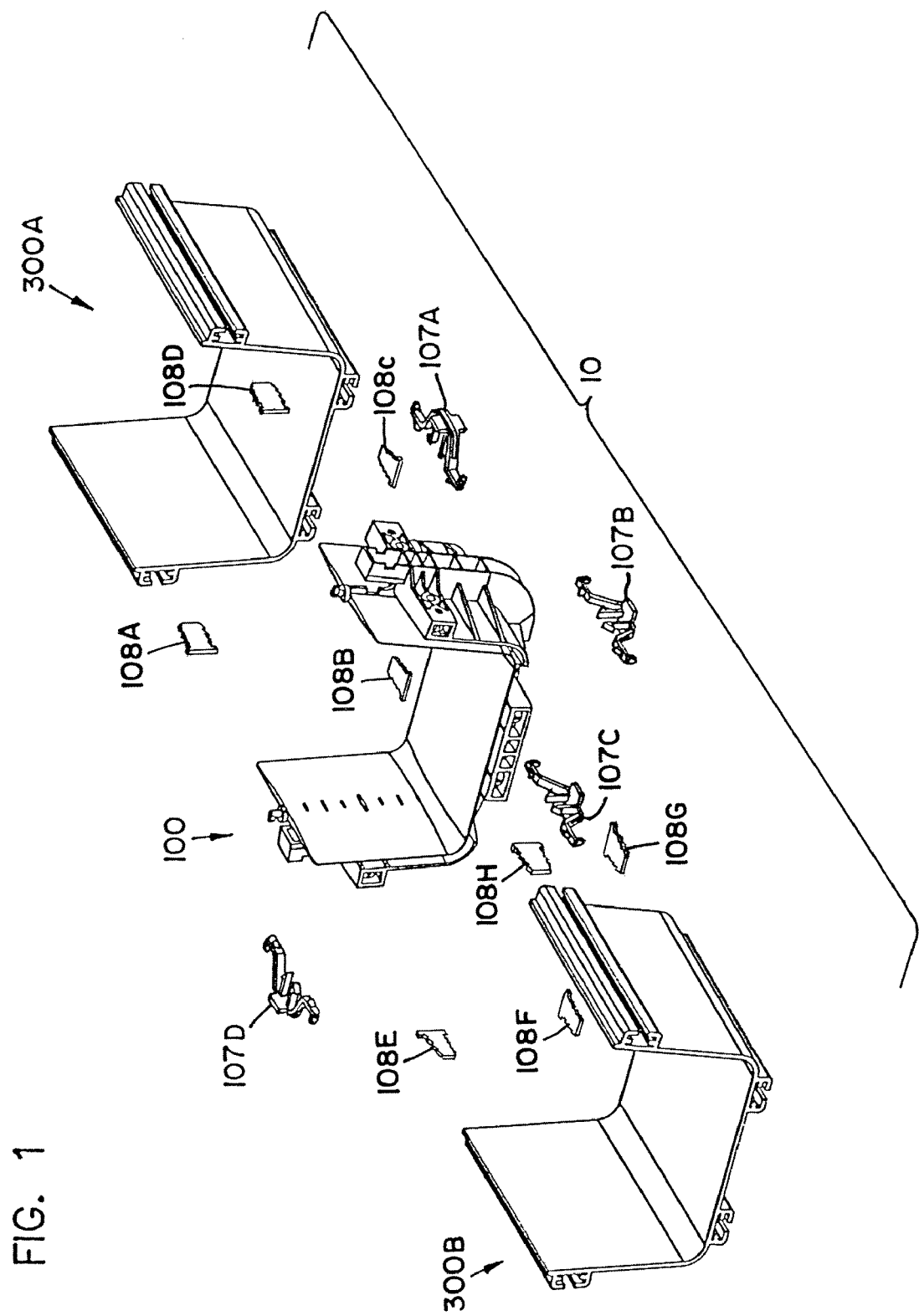
FIG. 1 is a perspective view of an embodiment of a trough system shown in exploded form.

FIG. 1 shows an example trough system 10 including a coupler 100 for interconnecting trough members 300A, 300B. Coupler 100 includes locking elements 107A, 107B, 107C, 107D. Trough members 300A, 300B include clips 108A, 108B, 108C, 108D, 108E, 108F, 108G, 180H. As described below, locking elements 107A, 107B, 107C, 107D and clips 108A, 108B, 108C, 108D, 108E, 108F, 108G, 180H secure the connection between coupler 100 and trough members 300A, 300B.

In addition, coupler 100 can be configured to release the connections between coupler 100 and trough members 300A, 300B. In an example embodiment, locking elements 107A, 107B, 107C, 107D and clips 108A, 108B, 108C, 108D, 108E, 108F, 108G, 180H are tool-less (i.e., do not require the use of a separate tool to couple and uncouple trough members 300A, 300B to coupler 100). However, elements requiring one or more auxiliary tools are also within the scope of the present disclosure.

I. Coupler

Figure 2:
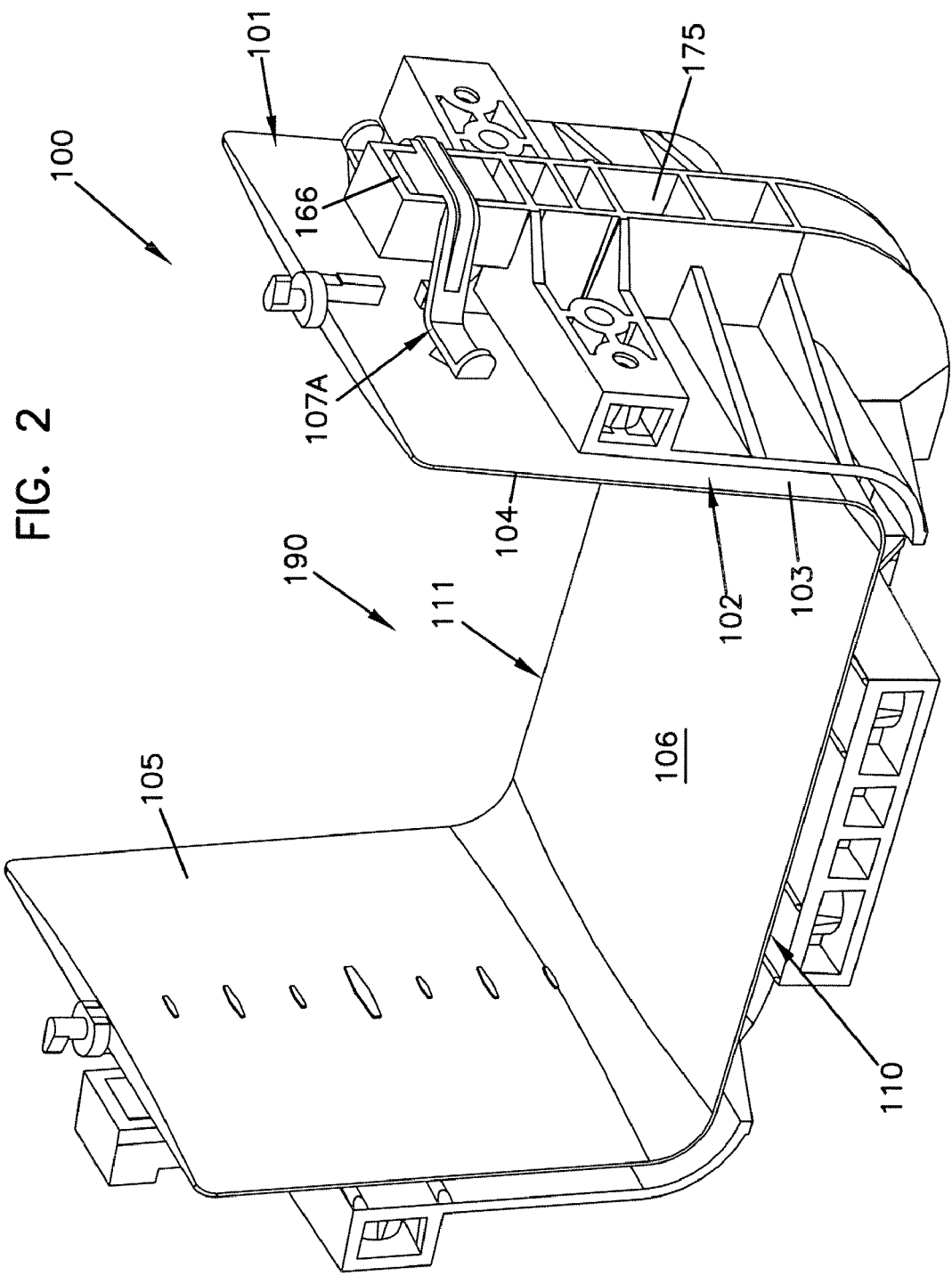
FIG. 2 is a perspective view of an embodiment of a coupler of the trough system of FIG. 1.
Figure 3:
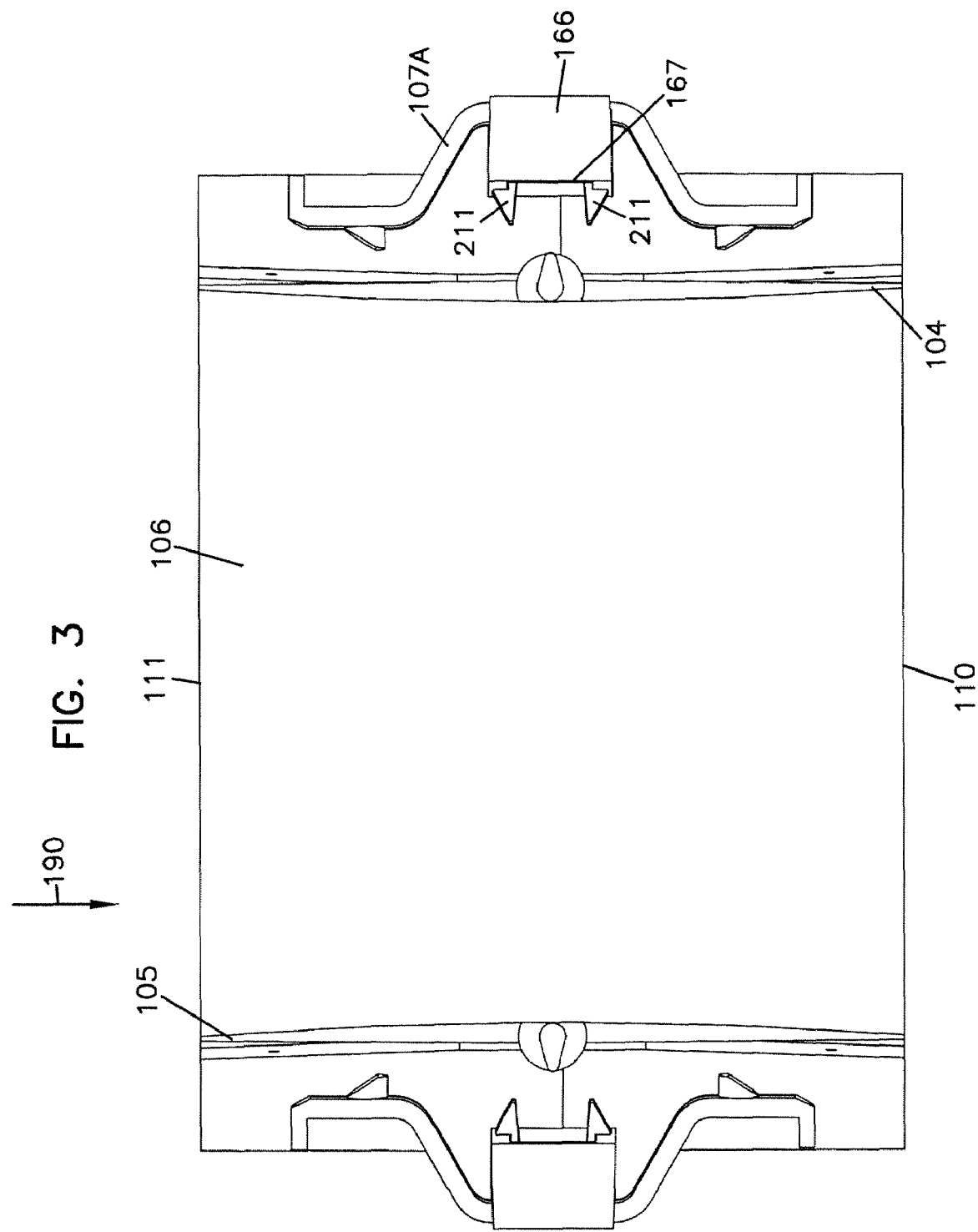
FIG. 3 is a top view of the coupler of FIG. 2.

As shown in FIGS. 2 and 3, coupler 100 includes a first guiding surface 101 and a second guiding surface 102 at least partially surrounding first guiding surface 101, as well as a first coupler end 110 and a second coupler end 111. A spacing 103 is defined between first guiding surface 101 and second guiding surface 102. Spacing 103 is sized to receive a trough member (e.g., trough members 300A, 300B) or another trough system component inserted into the spacing 103 in a longitudinal direction 190.

First guiding surface 101 of coupler 100 is generally in the shape of a trough, including a first side wall portion 104 and a second side wall portion 105, as well as a bottom wall portion 106 joining first and second side wall portions 104 and 105. As used herein, the term "trough" means any structure that defines an interior in which an element such as an optical cable can be maintained. Second guiding surface 102 is also in the shape of a trough. A midpoint or midsection 175 divides coupler 100 into first and second halves, and generally surrounds at least a portion of first guiding surface 101.

Figure 4:
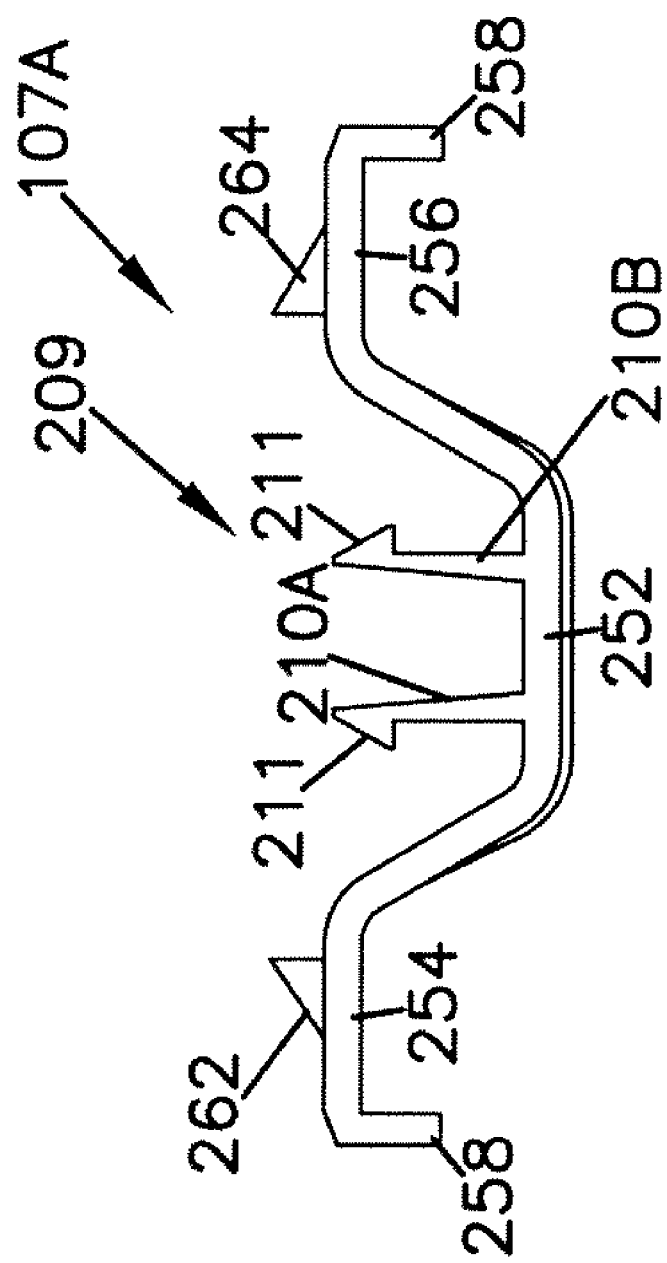
FIG. 4 is a side view of an embodiment of a locking element of the trough system of FIG. 1.

Referring now to FIGS. 2 and 4, locking element 107A is described in more detail. Locking element 107A includes a main body 252 and arms 254, 256 extending therefrom. A clip member 209 of main body 252 is configured to couple locking element 107A to coupler 100. Clip member 209 includes members 210A, 210B with wedges 211 at the ends thereof. Locking element 107A is coupled to coupler 100 by placing members 210A, 210B of clip member 209 through a frame member 166 formed in midpoint 175 of coupler 100. As clip member 209 is placed into frame member 166, wedges 211 engage opposing sides of frame member 166, and members 210A, 210B are compressed towards each other until wedges 211 clear frame member 166. In this position, wedges 211 engage an end 167 of frame member 166 to maintain locking element 107A on coupler 100. Locking element 107A can be removed from coupler 100 by compressing members 210A, 210B towards one another until wedges 211 clear end 167 of frame member 166. In this position, clip member 209 can be removed from frame member 166 to remove locking element 107A from coupler 100.

Each arm 254, 256 of locking element 107A includes a barb 262, 264 extending therefrom. Outer ends 258 of arms 254, 256 extend outwardly in a direction opposite to that of barbs 262, 264 to allow the user to easily grasp and move a respective arm into the unlocked position. Arms 254, 256 flex to allow ends 258 and barbs 262, 264 to move independently and relative to main body 252, as described further below.

II. Trough

Figure 5:
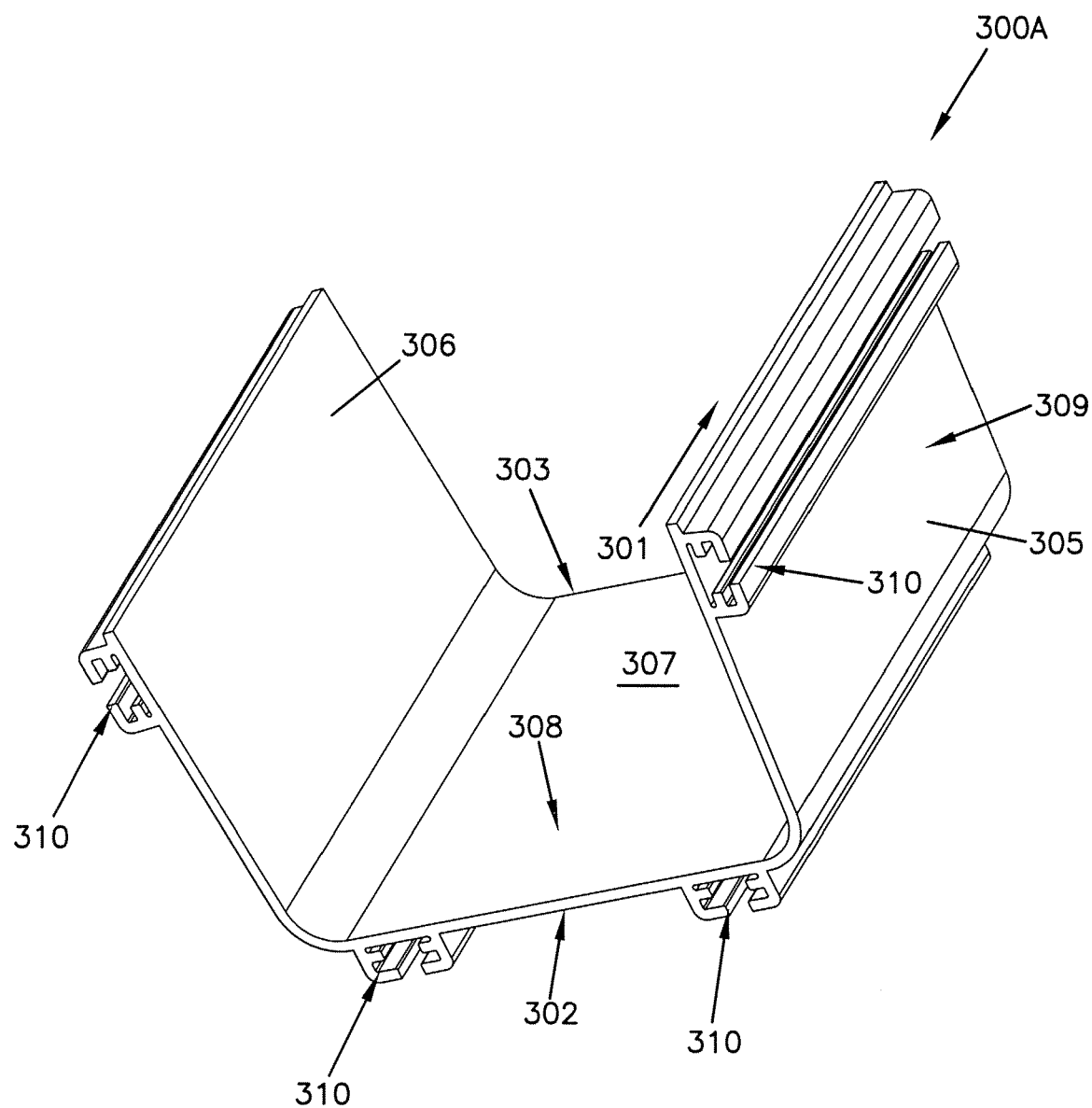
FIG. 5 is a perspective view of an embodiment of a trough member of the trough system of FIG. 1.

Referring now to FIGS. 5 and 6, trough member 300A is shown in more detail. As used herein, the phrase "trough member" is used to refer to any trough, fitting, railway, raceway, or similarly configured component including any number of ends. Although a specific embodiment of a trough member is shown in and described herein, other trough members can also be used.

Trough member 300A includes a first terminal end 302 and a second terminal end 303. Trough member 300A is generally in the shape of a trough including first and second side walls 305, 306 coupled by a bottom wall 307, thereby defining an interior surface 308 and an exterior surface 309. Walls 305, 306, 307 are each generally planar.

The exterior surface 309 define one or more slots 310 on the side walls 305 and 306 and bottom wall 307. Slots 310 extend in a longitudinal direction 301 of the trough member 300A from the first terminal end 302 to the second terminal end 303. In example embodiments, slot 310 is formed by two walls 312 that define a space 314 therebetween. Typically, slots 310 will be provided to correspond to at least one or more of locking element 107A, 107B, 107C, 107D, as described further below.

Alternative configurations and placement for the slots 310 are also possible. For example, the slots 310 may be T-slots, as shown on the example embodiment of the trough 300A. As used herein, the term "T-slot" means a slot having a narrow access opening and a wider interior region. In addition, the slots 310 may also be flanges or opposing projections. Other configurations are possible. Example slot configurations include two opposing walls that extend in the longitudinal direction 301, although a single surface may also be used. The slots 310 may not extend fully between the terminal ends of the trough member. The placement of the slots on the exterior surface of the trough members may be altered. More or fewer slots may also be provided.

Referring now to FIG. 7, clip 108A is shown. Clip 108A includes a main body 410 with a first end 422 and a second end 424. Clip 108A is generally shaped as a wedge or arrow to allow clip 108A to be inserted into space 314 of slot 310 of trough member 300A. Main body 410 includes teeth 415 formed on opposing outer edges of main body 410 to engage portions of slot 310 of trough member 300A when clip 108A is inserted into slot 310. Tabs 420 are formed at second end 424 of main body 410. Main body 410 also includes a slot 430 extending from first end 422 that divides main body 410 into portions 432, 434. Slot 430 and tabs 420 facilitate insertion of clip 108A into slot 310 of trough member 300A, as described below.

Figure 8:
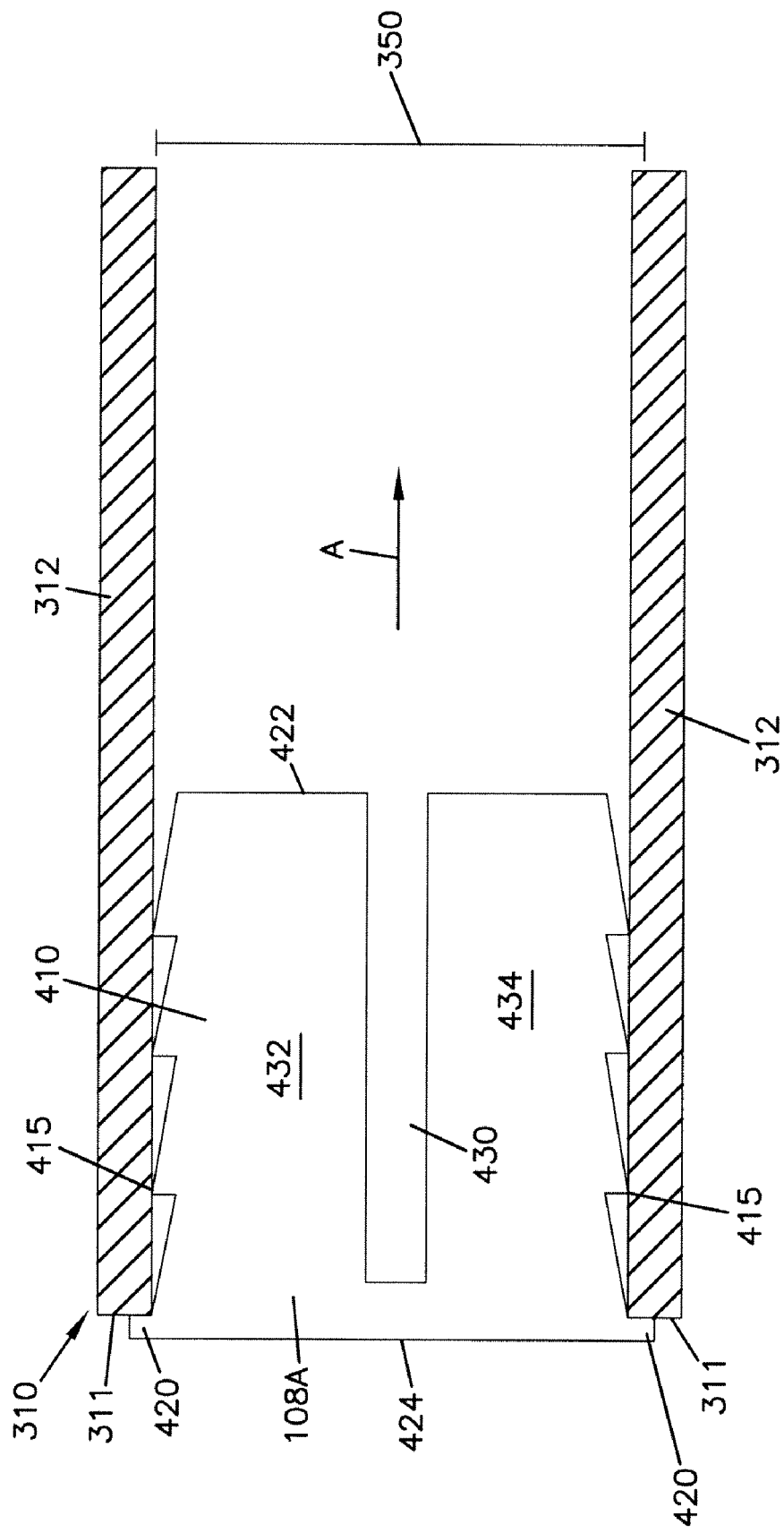
FIG. 8 is a cross-sectional view of a portion of the trough member of FIG. 5 including a clip.
Figure 9:
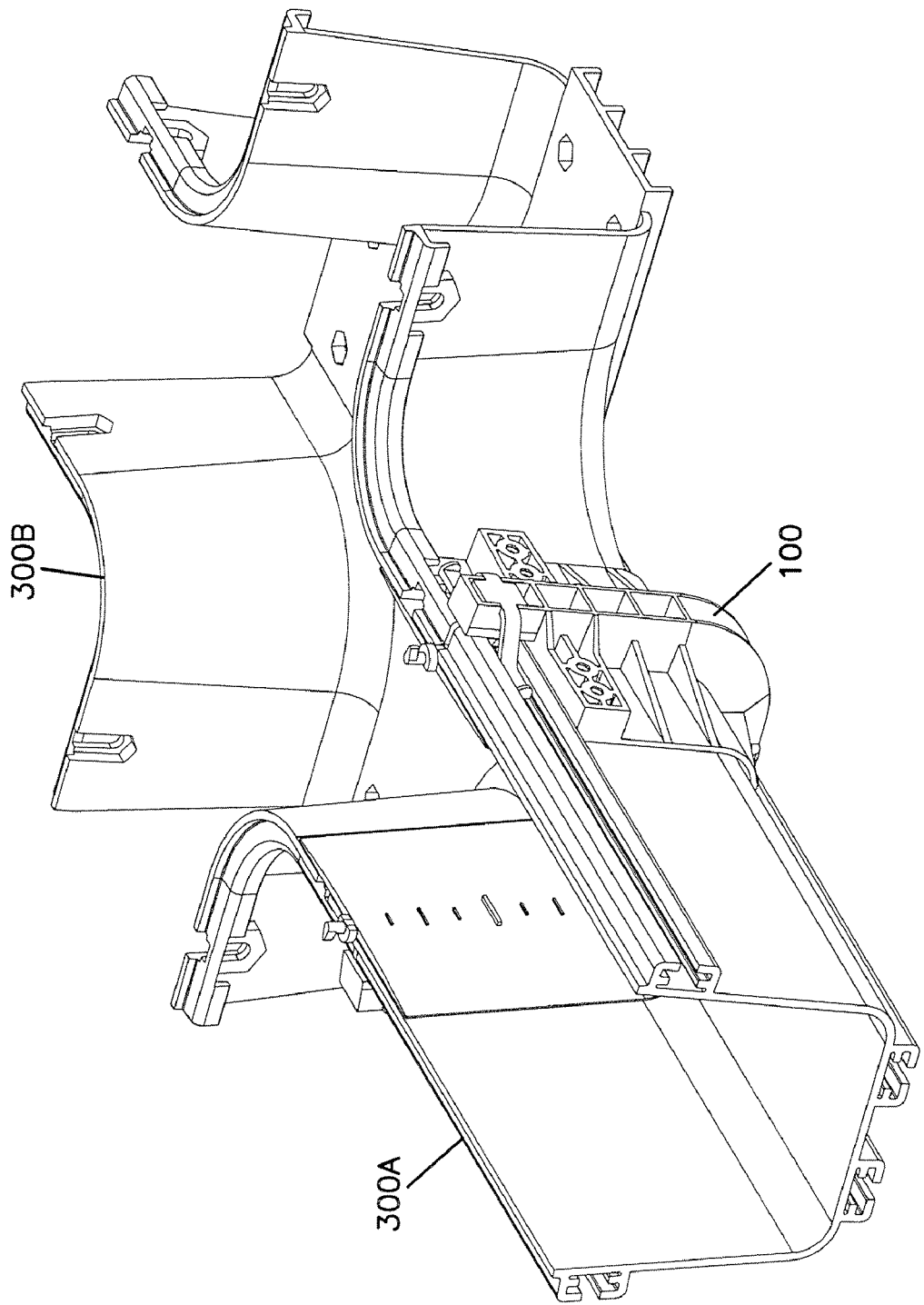
FIG. 9 is a perspective view of another embodiment of a trough system.

Referring now to FIG. 8, clip 108A is shown inserted into space 314 of slot 310. To do so, first end 422 of clip 108A is introduced into space 314 of slot 310 and clip 108A is slid into slot 310 in a direction A. A width 450 of clip 108A (see FIG. 7) is slightly larger than a width 350 of walls 312 of slot 310 so that, when clip 108 is slid into slot 310 in direction A, teeth 415 engage walls 312 of slot 310 and portions 432, 434 of main body 410 are compressed slightly towards one another.

Clip 108A is slid in direction A until tabs 420 on end 424 contact end 311 of slot 310, as shown in FIG. 8. In this configuration, portions 432, 434 remain under slight compression, and the serrated shape of teeth 415 engage walls 312 to resist movement of clip 108A in a direction opposite of that of direction A to maintain clip 108A within slot 310.

In example embodiments, clip 108A is made of metal. In other embodiments, other materials, such as plastic, can be used.

In example embodiments, clips 108B, 108C, 108D, 108E, 108F, 108G, and 108H can be inserted into respective slots 310 of coupler 300A in a similar manner.

III. System

Referring now to FIGS. 1, 2, 5, and 9, terminal ends 302, 303 of the trough members 300A, 300B are slidingly engaged in the spacing 103 between the first and second guiding surfaces 101 and 102 of the coupler 100. The thickness of the walls of each of the trough members 300A, 300B, or the distance between the inner and outer surfaces 308, 309, are sized to fit within the spacing 103 of the coupler 100. The coupler 100 overlaps the terminal ends 302, 303 of each of the trough members 300A, 300B to form the coupling, the overlap defining an overlap region.

Figure 10:
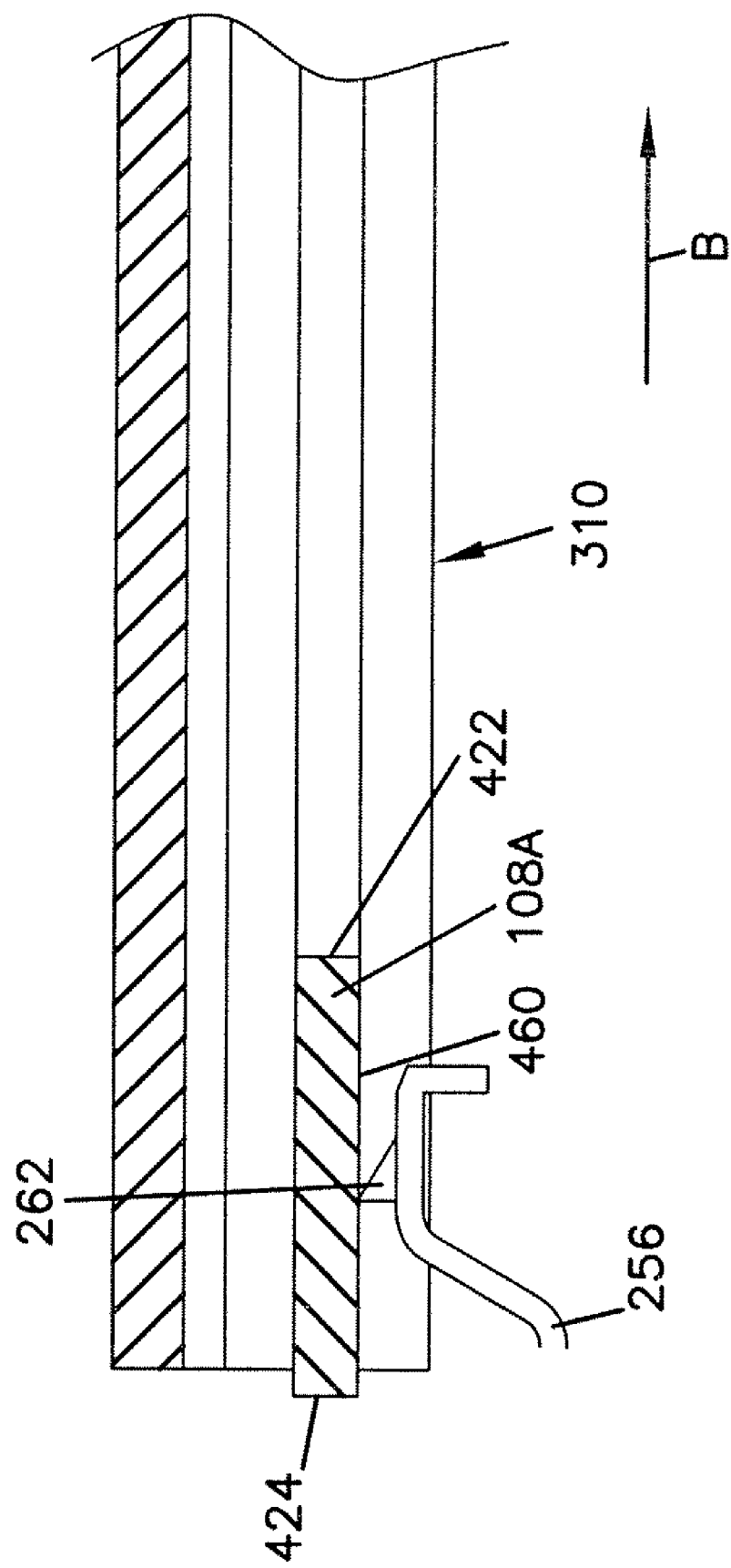
FIG. 10 is a cross-sectional view of a portion of a trough member partially coupled to a coupler.

Referring now to FIGS. 10-13, as terminal end 302, 303 of each trough member 300A, 300B is inserted into a respective end 110, 111 of the coupler 100 in a direction B, arms 254, 256 of locking elements 107A extend into slots 310 of trough members 300A, 300B. As shown in FIG. 10, barb 262 of locking element 107A contacts second end 424 of clip 108A and flexes slightly outward to ride along an outer surface 460 of clip 108A as trough member 300A is inserted into coupler 100.

Figure 11:
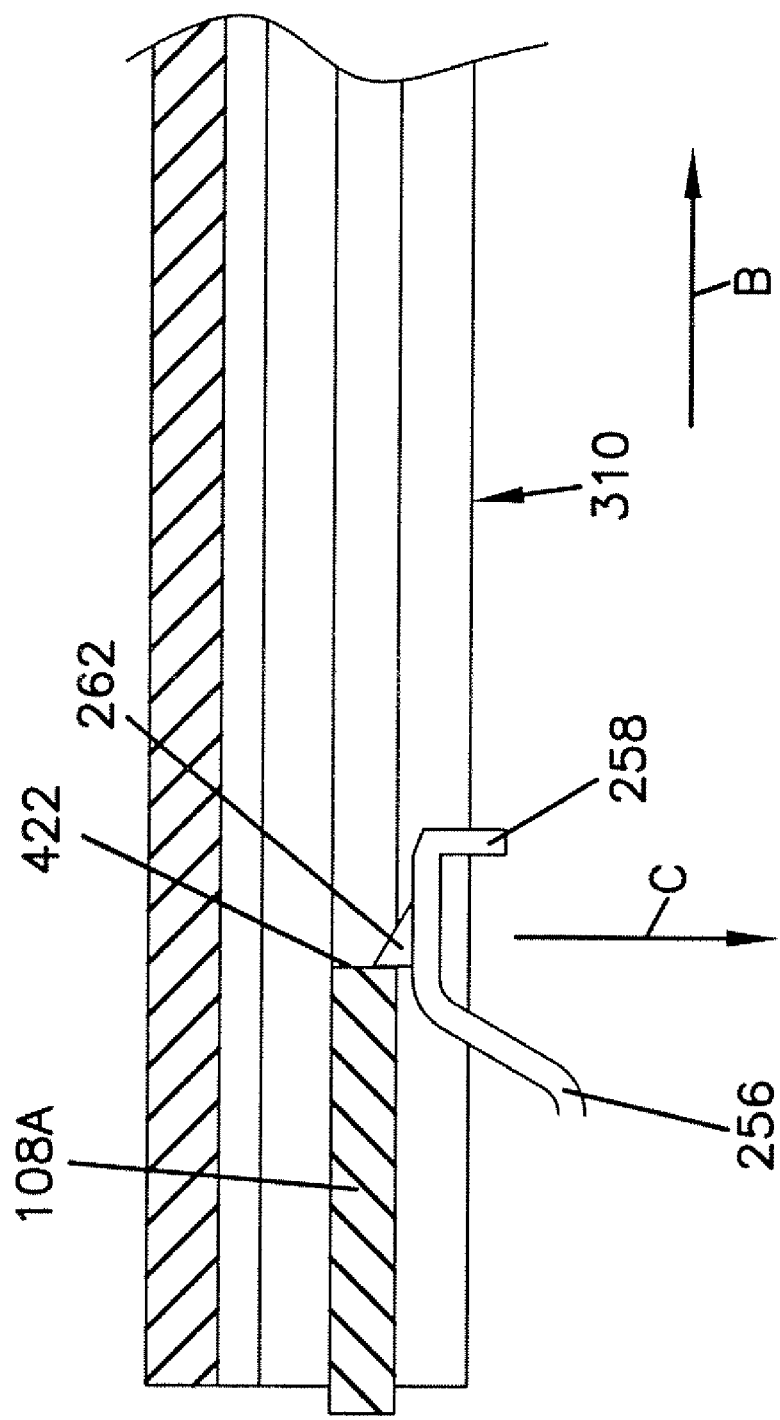
FIG. 11 is another cross-sectional view of the portion of the trough member fully coupled to the coupler of FIG. 10.
Figure 12:
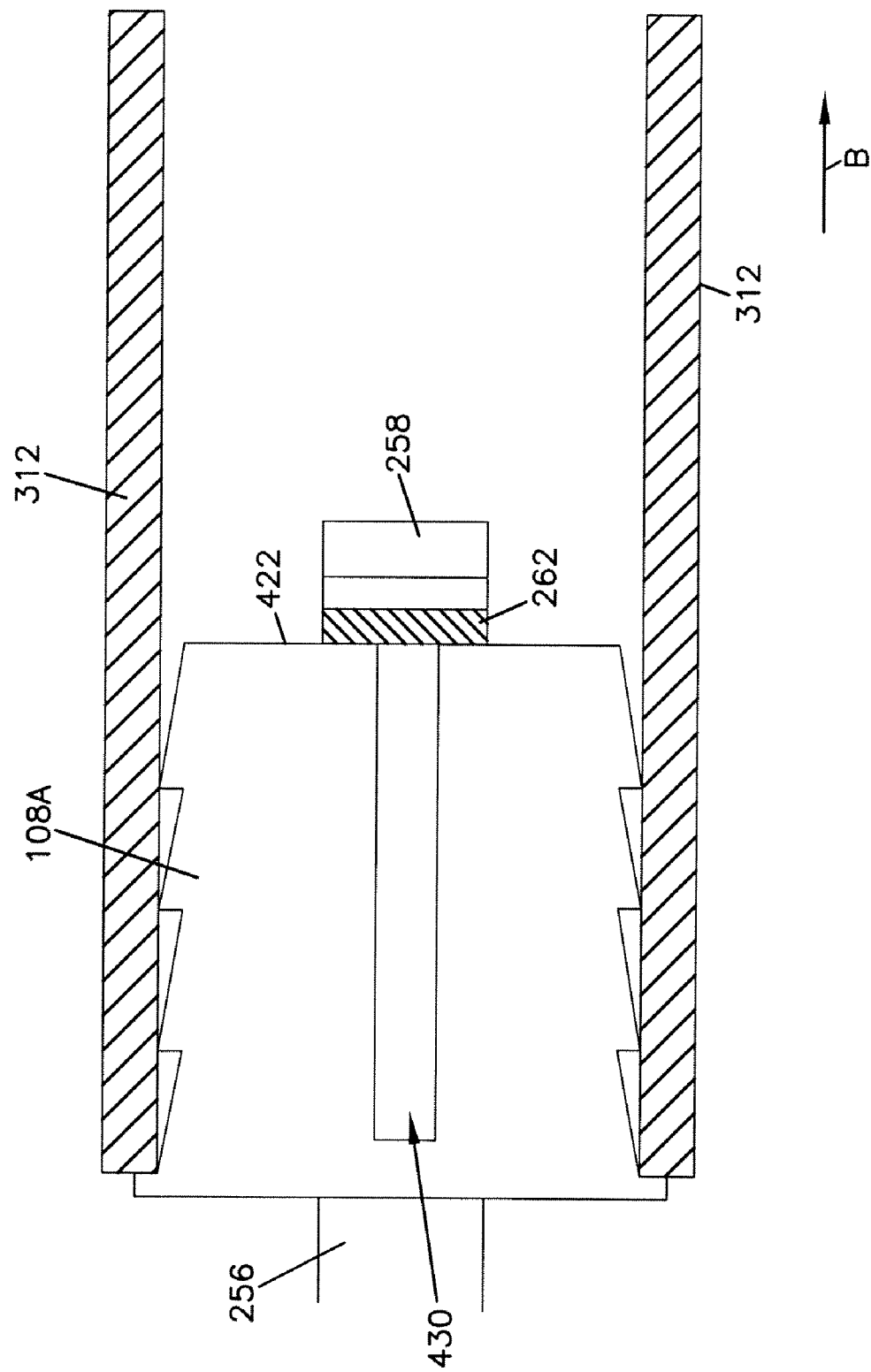
FIG. 12 is another cross-sectional view of the portion of the trough member fully coupled to the coupler of FIG. 10.

As shown in FIGS. 11-13, when trough member 300A is fully inserted into coupler 100, barb 262 slides past outer surface 460 of clip 108A. In this position, barb 262 engages first end 422 of clip 108A to resist movement of clip 108A and attached trough member 300A in a direction opposite to that of direction B.

To release trough member 300A, end 258 of arm 256 is moved in a direction C until barb 262 clears first end 422 of clip 108A. Once barb 262 clears first end 422, trough member 300A can be removed from spacing 103 of coupler 100.

Trough member 300B can be coupled to the opposite end of coupler 100 in a similar manner. In example embodiments, each end 258 of arms 254, 256 of locking element 107A can be moved separately to separately release trough members 300A, 300B. Alternatively, both ends 258 of locking element 107A can be moved at the same time to release both trough members 300A, 300B at the same time.

The other locking elements 107B, 107C, 107D and clips 108B, 108C, 108D, 108E, 108F, 108G, 108H function in a manner similar to that of locking element 107A and clip 108A.

IV. Method of Use

An example method for coupling one or both of trough members 300A, 300B to coupler 100 is as follows. Clips 108A, 108B, 108C, 108D, 108E, 108F, 108G, 108H are inserted into slots 310 on trough members 300A, 300B. Locking elements 107A, 107B, 107C, 107D are coupled to coupler 100.

Terminal end 302 of trough member 300A is inserted into spacing 103 of coupler 100 in direction 190. As trough member 300A is inserted into coupler 100, barbs 262 of locking elements 107A, 107B, 107C, 107D ride along respective clips 108A, 108B, 108C, 108D in slots 310 of trough member 300A. When trough member 300A is fully inserted into coupler 100, barbs 262 clear clips 108A, 108B, 108C, 108D and contact first ends 422 of clips 108A, 108B, 108C, 108D. In this position, barbs 262 engage first ends 422 of clips 108A, 108B, 108C, 108D to resist movement of trough member 300A out of coupler 100. Trough member 300B can be coupled to second coupler end 111 of coupler 100 in a similar manner.

An example method of removing trough member 300A includes moving ends 258 of arms 256 of locking elements 107A, 107B, 107C, 107D so that barbs 262 clear first ends 422 of clips 108A, 108B, 108C, 108D. Once barbs 262 clear first ends 422 of clips 108A, 108B, 108C, 108D, trough member 300A can be removed from spacing 103 of coupler 100. Trough member 300B can be removed in a similar fashion.

In example embodiments, the locking elements disclosed herein are tool-less in that the locking elements do not require a separate tool to move the locking elements from the locked position to the unlocked position and vice versa. For example, in some embodiments, the locking elements can be moved from the locked position to the unlocked position through use of the user's hand.

In example embodiments, the locking elements disclosed herein are auto-locking, in that the locking elements can be placed in the locked position prior to insertion of the trough member into the coupler. When the trough member is introduced into the coupler, the locking elements automatically lock the trough member to the coupler. The locking elements can subsequently be moved to the unlocked position to release the trough member from the coupler.

Alternative embodiments to those provided herein are also possible. For example, in one alternative embodiment, the locking elements include straight, rather than curved, arms. In other embodiments, other features or components are included at the ends of the arms of the locking elements to assist a user in moving the arms and associated barbs away from the exterior surface of the trough members. In other alternative embodiments, a coupler can be configured to be coupled to more than two trough members, therefore including more than the first and second coupler ends. Further, a greater number of locking elements and/or clips can be presented for each coupler end, or, alternatively, fewer locking elements such as, for example, two on opposing sides, can be used.

The above specification, examples and data provide a complete description of the manufacture and of the invention. Since many embodiments of the invention can be made without departing from the spirit and scope of the disclosure, the invention resides in the claims hereinafter appended.

What is claimed is:

1. A cable trough system, comprising:
a first trough member including an exterior surface defining a slot extending in a longitudinal direction along the exterior surface, and a clip including first and second ends positioned in the slot adjacent a terminal end of the first trough member, the clip defining an outer structure that fixedly retains the clip within the slot of the first trough member; and
a coupler including a body including a bottom wall and two side walls defining a trough, the body having a body terminal end defining an overlap region, the overlap region being sized to slideably receive a terminal end of a first trough member along a longitudinal direction of the body, and the coupler including a locking element including a main body, a clip member configured to couple the main body to the coupler, a first arm extending from the main body, the first arm being configured to flex relative to the main body, and a first barb coupled to the first arm;
wherein, as the first trough member is inserted into the coupler, the first barb of the locking element contacts and rides along a surface of the clip, and wherein, when the first trough member is fully inserted into the coupler, the first barb engages the first end of the clip in the slot to couple the first trough member to the coupler.

2. The system of claim 1, wherein the outer structure of the clip defines a wedge shape with teeth formed on outer opposing sides of the clip to allow the clip to engage walls of the slot.

3. The system of claim 2, wherein the clip defines a notch that divides the clip into first and second portions, the first and second portions being compressed towards one another when the clip is inserted into the slot.

4. The system of claim 3, wherein a width of the clip is greater than a width of the slot of the trough member.

5. The system of claim 2, wherein the clip defines a tab adjacent to the second end of the clip, wherein the tab contacts an end of the slot when the clip is fully inserted into the slot of the trough member.

6. The system of claim 1, wherein the locking element further comprises:
a second arm extending in opposition to the first arm from the main body, the second arm being configured to flex relative to the main body; and a second barb coupled to the second arm, wherein the second barb is configured to engage a clip in a slot of a second trough member.

7. The system of claim 1, wherein the trough member defines a plurality of slots, each slot including a clip.

8. A cable trough system, comprising:
a first trough member including an exterior surface defining a slot extending in a longitudinal direction along the exterior surface, and a clip including first and second ends positioned in the slot adjacent a terminal end of the first trough member, the clip having a wedge shape with teeth formed on outer opposing sides of the clip to allow the clip to engage walls of the slot, the clip defining a notch that divides the clip into first and second portions, the first and second portions being compressed towards one another when the clip is inserted into the slot, and the clip including a tab adjacent the second end of the clip that contacts an end of the slot when the clip is fully inserted into the slot of the trough member; and
a coupler including a body including a bottom wall and two side walls defining a trough, the body having a body terminal end defining an overlap region, the overlap region being sized to slideably receive a terminal end of a first trough member along a longitudinal direction of the body, and a locking element including a main body, a clip member configured to couple the main body to the coupler, a first arm extending from the main body, the first arm being configured to flex relative to the main body, and a first barb coupled to the first arm;
wherein, as the first trough member is inserted into the coupler, the first barb of the locking element contacts and rides along a surface of the clip, and wherein, when the first trough member is fully inserted into the coupler, the first barb engages the first end of the clip in the slot to couple the first trough member to the coupler.

9. A cable trough, comprising:
a trough body including a wall defining a trough, the wall including an exterior surface defining a slot extending in a longitudinal direction along an exterior surface of the body; and
a clip including first and second ends, the clip being positioned in the slot adjacent a terminal end of the slot, the clip having a wedge shape with teeth formed on outer opposing sides of the clip to allow the clip to engage walls of the slot, the clip defining a notch that divides the clip into first and second portions, the first and second portions being compressed towards one another when the clip is inserted into the slot, and the clip including a tab adjacent the second end of the clip that contacts the terminal end of the slot when the clip is fully inserted into the slot of the trough body.

10. A clip for a cable trough, the clip comprising:
first and second ends and opposing first and second sides forming a general wedge shape;
teeth formed on the first and second sides;
a stop tab formed on the first end to contact a terminal end of a slot of a trough member when the clip is fully inserted into the slot of the trough member; and
a notch formed in the second end that divides the clip into first and second portions, the first and second portions being compressible towards one another when the clip is inserted into the slot of the trough member.

11. A method for coupling a coupler to a trough member, the method comprising:
positioning a locking element on the coupler, the locking element including a main body, an arm extending from the main body, the arm being configured to flex relative to the main body, and a barb coupled to the arm;
positioning a clip within a slot defined by the trough member so that the clip is fixedly retained in the slot of the trough member;
sliding the trough member into the coupler so that the barb rides along the clip until the trough member is inserted into the coupler; and
allowing the barb of the locking element to engage an end of the clip to resist movement of the trough member out of the coupler.

12. The method of claim 11, further comprising:
flexing the arm of the locking element away from the clip until the barb clears the end of the clip; and
removing the trough member from the coupler.

13. The method of claim 11, wherein positioning the clip within the slot further comprises sliding the clip into the slot until a tab on the clip contacts an end of the slot.

14. The method of claim 11, wherein the clip defines a notch that divides the clip into first and second portions, the first and second portions being compressed towards one another when the clip is inserted into the slot.

15. The method of claim 11, wherein a width of the clip is greater than a width of the slot of the trough member.

* * * * *